(12) United States Patent
 Ishizaki et al.

(10) Patent No.: US 12,670,738 B2
(45) Date of Patent: Jun. 30, 2026

(54) IMAGE PROCESSING DEVICE OF PERSON DETECTION SYSTEM

(71) Applicant: KABUSHIKI KAISHA TOYOTA JIDOSHOKKI, Kariya (JP)

(72) Inventors: Masataka Ishizaki, Aichi-ken (JP); Takuto Mihoichi, Aichi-ken (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 600 days.

(21) Appl. No.: 18/098,969

(22) Filed: Jan. 19, 2023

(65) Prior Publication Data

US 2023/0237830 A1     Jul. 27, 2023

(30) Foreign Application Priority Data

Jan. 24, 2022     (JP) ................................. 2022-008777

(51) Int. Cl.
| | |
|---|---|
| *G06K 9/00* | (2022.01) |
| *G06V 10/75* | (2022.01) |
| *G06V 20/58* | (2022.01) |
| *G06V 40/10* | (2022.01) |

(52) U.S. Cl.
CPC ............ *G06V 40/10* (2022.01); *G06V 10/759* (2022.01); *G06V 20/58* (2022.01)

(58) Field of Classification Search
CPC ....... G06V 40/10; G06V 10/759; G06V 20/58
See application file for complete search history.

(56) References Cited

U.S. PATENT DOCUMENTS

2014/0168431 A1* 6/2014 Goto ...................... G06F 18/28
                                                      348/143
2018/0268228 A1     9/2018 Okada et al.

FOREIGN PATENT DOCUMENTS

| CN | 110956069 A | | 4/2020 |
|---|---|---|---|
| JP | 2020135616 A | * | 8/2020 |
| WO | 2020/129517 A1 | | 6/2020 |

OTHER PUBLICATIONS

Extended European Search Report issued on May 11, 2023 in EP Patent Application No. 23 15 1714.
Canadian Office Action dated May 29, 2024 in Application No. 3,186,452.

(Continued)

*Primary Examiner* — Molly Wilburn
*Assistant Examiner* — Aidan Keup
(74) *Attorney, Agent, or Firm* — Sughrue Mion, PLLC

(57) ABSTRACT

An image processing device of a person detection system mounted on a moving body is configured to: detect, in image data obtained from a camera, an area in which an obstacle appears; determine whether the area meets an upper body detection process condition that the obstacle in the area is distanced from a road surface within a predetermined range from the camera; perform an upper body detection process in which the area of the image data is compared with upper body comparison data to determine whether the obstacle in the area is a person, for the area that meets the upper body detection process condition; and perform a whole-body detection process in which the area of the image data is compared with whole-body comparison data to determine whether the obstacle in the area is a person, for the area that does not meet the upper body detection process condition.

4 Claims, 4 Drawing Sheets

(56)     References Cited

OTHER PUBLICATIONS

Examination Report issued Nov. 23, 2023 in Indian Application No. 202344003313.
Office Action issued Jan. 31, 2025 in Japanese Application No. 2022-008777.
Communication dated Jul. 22, 2025, issued in Chinese Application No. 202310055426.6.
Canadian Office Action dated Jan. 12, 2026, issued in Canadian application No. 3,186,452.
Communication dated Oct. 1, 2025 in European Application No. 23 151 714.5.
Communication dated Oct. 16, 2025 in Chinese Application No. 202310055426.6.
English Translation communication dated Feb. 28, 2026 issued by the Korean Patent Office in application No. 10-2023-0005905.

* cited by examiner

HEIGHT OF UPPER END
OF RECTANGULAR AREA [mm]

IMAGE PROCESSING DEVICE OF PERSON DETECTION SYSTEM

BACKGROUND ART

Cross-Reference to Related Application

This application claims priority to Japanese Patent Application No. 2022-008777 filed on Jan. 24, 2022, the entire disclosure of which is incorporated herein by reference.

The present disclosure relates to an image processing device of a person detection system.

An obstacle detector for detecting an obstacle is mounted on a moving body such as a vehicle. In Japanese Patent Application Publication No. 2020-135616, an obstacle detector includes a camera and an image processing device. The image processing device obtains image data from the camera. The image processing device performs a person detection process for the image data. The person detection process is performed using HOG (Histogram of Oriented Gradients) features, for example.

There may be a case where image data does not include a whole body of a person due to a part of a moving body appearing in an imaging range of a camera, for example. In this case, accuracy of person detection decreases when a person detection process is performed.

SUMMARY

In accordance with an aspect of the present disclosure, there is provided an image processing device of a person detection system mounted on a moving body, the image processing device configured to: detect, in image data obtained from a camera, an area in which an obstacle appears; determine whether the area meets an upper body detection process condition that the obstacle in the area is distanced from a road surface within a predetermined range from the camera; perform an upper body detection process in which the area of the image data is compared with upper body comparison data to determine whether the obstacle in the area is a person, for the area that meets the upper body detection process condition; and perform a whole-body detection process in which the area of the image data is compared with whole-body comparison data to determine whether the obstacle in the area is a person, for the area that does not meet the upper body detection process condition.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment of an image processing device of a person detection system.

Forklift Truck

Figure 1:
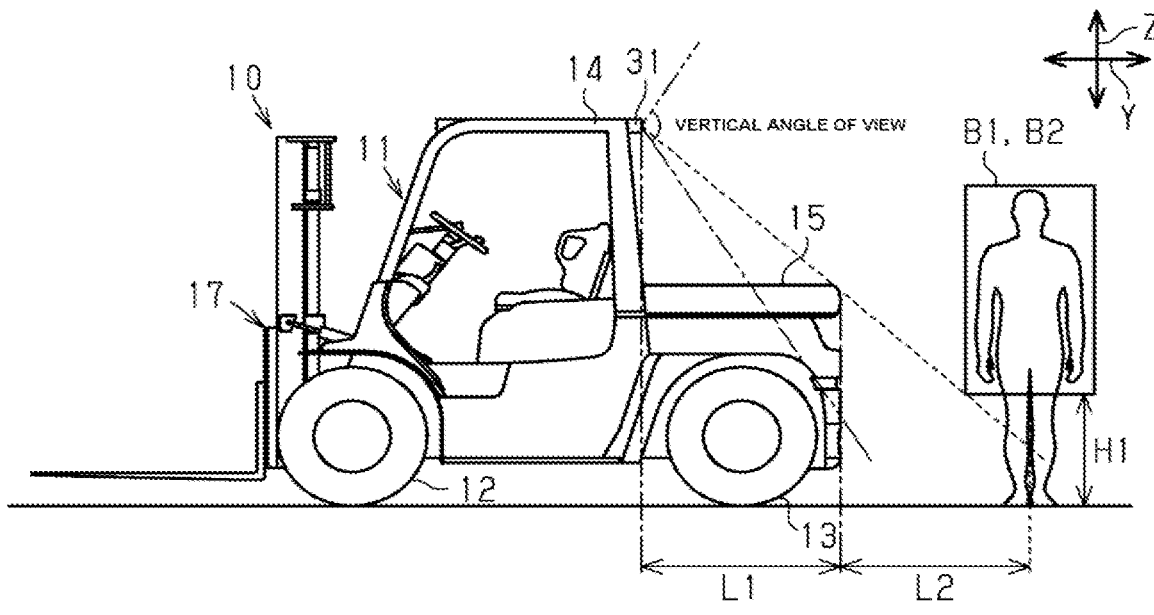
FIG. 1 is a side view of a forklift truck.

As illustrated in FIG. 1, a forklift truck 10 serving as a moving body includes a vehicle body 11, driving wheels 12, steering wheels 13, and a cargo handling apparatus 17. The vehicle body 11 includes a head guard 14 and a counterweight 15. The head guard 14 is provided above a driver seat. The counterweight 15 is provided at a rear part of the vehicle body 11. The counterweight 15 is a member for balancing a cargo loaded in the cargo handling apparatus 17. The forklift truck 10 may be operated in response to an operation by an operator, may be operated automatically, or may be switchable between a manual operation and an automatic operation. The forklift truck 10 is an example of an industrial vehicle.

Figure 2:
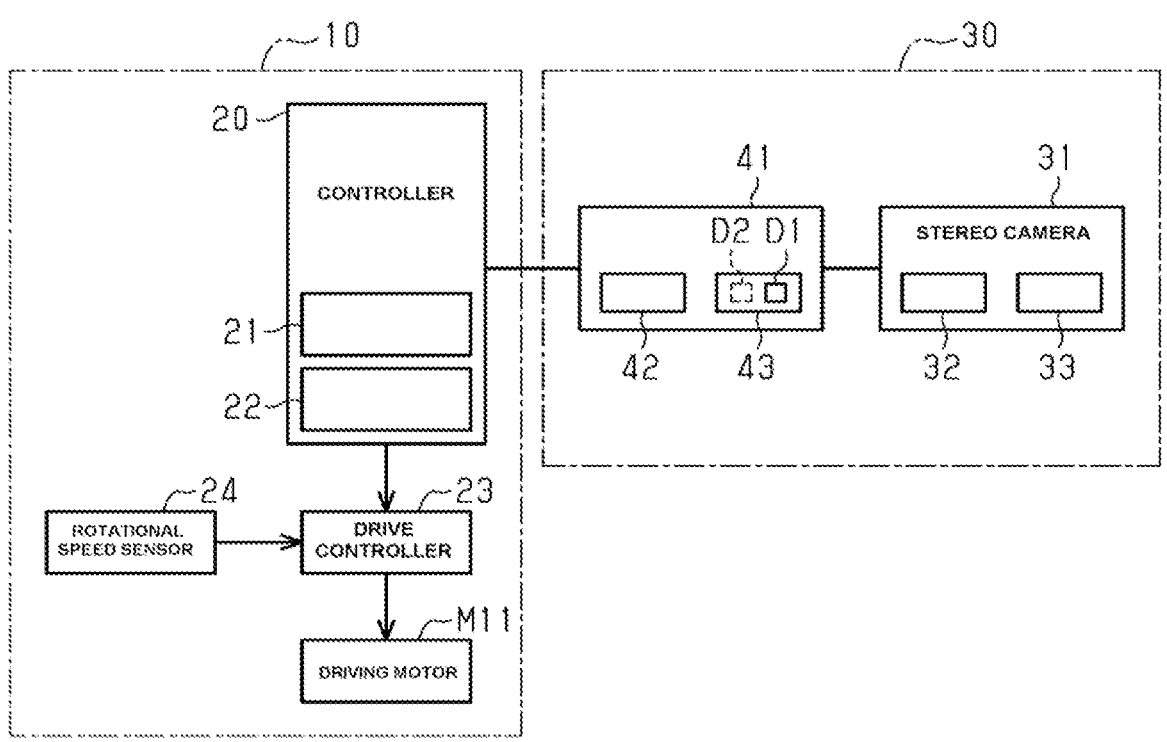
FIG. 2 is a schematic block diagram of the forklift truck and a person detection system.

As illustrated in FIG. 2, the forklift truck 10 includes a controller 20, a driving motor M11, a drive controller 23 controlling the driving motor M11, and a rotational speed sensor 24. The controller 20 controls a drive operation and a cargo handling operation. The controller 20 includes a processor 21 and a memory 22. The processor 21 is a CPU (Central Process Unit), a GPU (Graphics Process Unit), a DSP (Digital Signal Processor), or the like. The memory 22 has a RAM (Random Access Memory) and a ROM (Read Only Memory). The memory 22 stores programs for operating the forklift truck 10. The memory 22 stores program codes or commands configured to cause the processor 21 to execute processes. The memory 22, which is a computer readable medium, includes any available medium that is accessible by a general-purpose computer or a dedicated computer. The controller 20 may include a hardware circuit such as an ASIC (Application Specific Integrated Circuit), an FPGA (Field Programmable Gate Array), and the like. The controller 20, which is a process circuit, may include one or more processors for operating in accordance with the computer programs, one or more hardware circuits such as the ASIC and the FPGA, or a combination thereof.

The controller 20 gives the drive controller 23 a command for a rotational speed of the driving motor M11 such that a vehicle speed of the forklift truck 10 reaches a target vehicle speed. The drive controller 23 of the present embodiment is a motor driver. The rotational speed sensor 24 outputs the rotational speed of the driving motor M11 to the drive controller 23. In response to the command from the controller 20, the drive controller 23 controls the driving motor M11 such that the rotational speed of the driving motor M11 matches the command.

Person Detection System

A person detection system 30 is mounted on the forklift truck 10. The person detection system 30 includes a stereo camera 31 serving as a camera, and an image processing device 41. The person detection system 30 detects a person that is present around the forklift truck 10. The person detection system 30 may detect, in addition to the person, an obstacle other than the person. The image processing device 41 is an image processing device of the person detection system 30.

Stereo Camera

As illustrated in FIG. 1, the stereo camera 31 is disposed such that a road surface on which the forklift truck 10 is traveling can be seen from above the forklift truck 10. The stereo camera 31 is disposed in the head guard 14, for example. The stereo camera 31 captures an image of a rear area of the forklift truck 10. Thus, a person detected by the person detection system 30 is a person behind the forklift truck 10. The stereo camera 31 captures an image within an imaging range defined by a horizontal angle of view and a vertical angle of view. The counterweight 15 is included in a range of the vertical angle of view. Thus, a part of the counterweight 15 that is a part of the forklift truck 10 is always included in the image captured by the stereo camera 31.

As illustrated in FIG. 2, the stereo camera 31 includes a first camera 32 and a second camera 33. Examples of the first camera 32 and the second camera 33 include cameras using a CCD image sensor and a CMOS image sensor. The first camera 32 and the second camera 33 are arranged such that their optical axes are parallel to each other. Image data obtained by capturing of the image by the first camera 32 is referred to as first image data, and image data obtained by capturing of the image by the second camera 33 is referred to as second image data.

Image Processing Device

The image processing device 41 has a processor 42 such as a CPU, a GPU, or a DSP, and a memory 43 including a RAM and a ROM. The memory 43 stores various programs for detecting an obstacle from an image captured by the stereo camera 31. The memory 43 stores program codes or commands configured to cause the processor 42 to execute processes. The memory 43, which is a computer readable medium, includes any available medium that is accessible by a general-purpose computer or a dedicated computer. The image processing device 41 may include a hardware circuit such as an ASIC or an FPGA. The image processing device 41, which is a process circuit, may include one or more processors for operating in accordance with the computer programs, one or more hardware circuits such as the ASIC and the FPGA, or a combination thereof.

Whole-Body Dictionary Data

The memory 43 stores whole-body dictionary data D1. The whole-body dictionary data D1 is dictionary data for detecting a person. The whole-body dictionary data D1 is, for example, data of features extracted from a plurality of known image data in which the person appears. The whole-body dictionary data D1 of the present embodiment is dictionary data obtained from image data in which a whole body of the person appears. Examples of the features include HOG (Histograms of Oriented Gradients) features and CoHOG (Co-occurrence HOG) features. In the present embodiment, the HOG features are used. The HOG features each correspond to a histogram of a gradient intensity in a gradient orientation of a pixel value of a cell in the image data. The cell is a local area having a predetermined size. When the HOG features are calculated, the image data is divided into a plurality of cells. Then, for each cell, the histogram in the gradient orientation of the pixel value is calculated and normalized within a block that is a predetermined range around the cell. Thus, the HOG features can be obtained. When the image processing device 41 includes an auxiliary memory, the auxiliary memory may store the whole-body dictionary data D1.

Obstacle Detection Process

The following will describe an obstacle detection process performed by the image processing device 41. The processor 42 executes the programs stored in the memory 43 to perform the obstacle detection process. The obstacle detection process is repeatedly performed at a predetermined control cycle.

Figure 3:
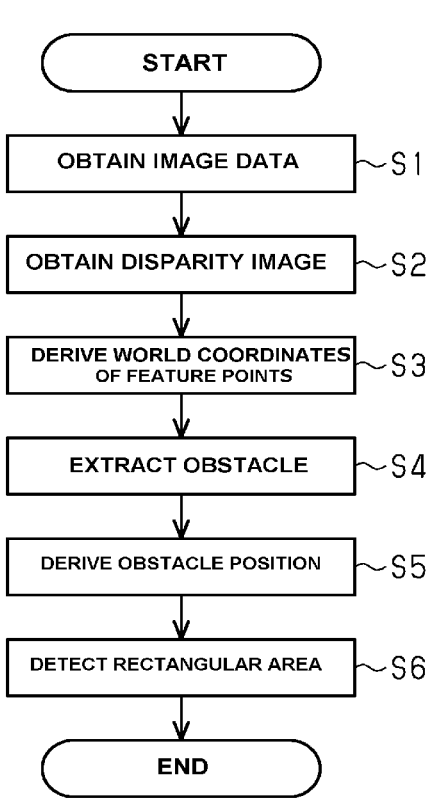
FIG. 3 is a flowchart illustrating an obstacle detection process performed by an image processing device.

As illustrated in FIG. 3, in Step S1, the image processing device 41 obtains the first image data and the second image data each having the same frame, from an image captured by the stereo camera 31.

Next, in Step S2, the image processing device 41 performs a stereo process to obtain a disparity image. The disparity image is an image in which a disparity [px] is associated with a pixel. The first image data and the second image data are compared with each other, and a difference in pixels between the first image data and the second image data is calculated for the same feature point in each of the first image data and the second image data, so that a disparity is obtained. The feature point corresponds to a point that is visually recognized as a border such as an edge of an obstacle. The feature point is detected from information of brightness, and the like.

The image processing device 41 converts RGB into YCrCb using the RAM temporarily storing each of the first image data and the second image data. The image processing device 41 may perform a distortion correction, an edge enhancement process, and the like. The image processing device 41 performs a stereo process in which a disparity is obtained by comparing similarity between each pixel of the first image data and each pixel of the second image data. In the stereo process, the disparity may be calculated for each pixel, or may be calculated using a block-matching algorithm. In the block-matching algorithm, each of the first image data and the second image data is divided into a plurality of blocks including a plurality of pixels to calculate the disparity for each block. The image processing device 41 obtains the disparity image based on the first image data as a reference image and the second image data as a comparison image. For each pixel of the first image data, the image processing device 41 extracts one of pixels of the second image data that is most similar to one of pixels of the first image data. Then, the image processing device 41 calculates a difference in horizontal pixel counts between the one of pixels of the first image data and the one of pixels of the second image data that is most similar to the one of pixels of the first image data as a disparity, which obtains the disparity image in which the disparity is associated with each pixel of the first image data that is the reference image. The disparity image need not be displayed, and may be data in which the disparity is associated with each pixel of the disparity image. The image processing device 41 may perform a process in which a disparity of a road surface is removed from the disparity image.

Next, in Step S3, the image processing device 41 derives coordinates of feature points in a world coordinate system. Firstly, the image processing device 41 derives coordinates of feature points in a camera coordinate system. In the camera coordinate system, the stereo camera 31 is defined as an original point. The camera coordinate system is a cartesian coordinate system consisting of three axes, a Z-axis corresponding to an optical axis, an X-axis and a Y-axis corresponding to two axes perpendicular to the optical axis, respectively. The coordinates of the feature points in the camera coordinate system are represented by a Z-coordinate Zc, an X-coordinate Xc, and Y-coordinate Yc in the camera coordinate system. The Z-coordinate Zc, the X-coordinate Xc, and the Y-coordinate Yc are derived using the following equations (1) to (3).

Equation 1

$$Zc = \frac{B \times f}{d} \quad (1)$$

Equation 1

$$Xc = (xp - x') \times \frac{Zc}{f} \quad (2)$$

Equation 1

$$Yc = (yp - y') \times \frac{Zc}{f} \quad (4)$$

In the equations (1) to (3), "B" represents a baseline length [mm], "f" represents a focal distance [mm], "d" represents a disparity [px], "xp" represents an arbitrary X-coordinate in a disparity image, "x" represents an X-coordinate of a center coordinate in the disparity image, "yp" represents an arbitrary Y-coordinate in the disparity image, and "y" represents a Y-coordinate of the center coordinate in the disparity image.

"xp" is defined as an X-coordinate of a feature point in the disparity image, "yp" is defined as a Y-coordinate of the feature point in the disparity image, and "d" is defined as a disparity associated with the X-coordinate and the Y-coordinate of the feature point. Thus, coordinates of the feature point in the camera coordinate system are derived.

Here, the world coordinate system is a coordinate system in a real space and is a cartesian coordinate system consisting of three axes, an X-axis corresponding to an axis extending in a horizontal direction, specifically in a vehicle width direction of the forklift truck 10, a Y-axis corresponding to an axis extending in the horizontal direction, specifically in a direction perpendicular to the X-axis, and a Z-axis corresponding to an axis perpendicular to the X-axis and the Y-axis, in a state where the forklift truck 10 is positioned on a horizontal plane. The Y-axis in the world coordinate system is also an axis extending in a front-rear direction of the forklift truck 10 that is a traveling direction of the forklift truck 10. The Z-axis in the world coordinate system is also an axis extending in a vertical direction. Coordinates of a feature point in the world coordinate system are represented by an X-coordinate Xw, a Y-coordinate Yw, and a Z-coordinate Zw in the world coordinate system.

The image processing device 41 uses the following equation 4 to perform a world coordinate conversion that is conversion from camera coordinates into world coordinates. The world coordinates are coordinates in the world coordinate system.

Equation 4

$$\begin{pmatrix} Xw \\ Yw \\ Zw \end{pmatrix} = \begin{pmatrix} 1 & 0 & 0 \\ 0 & \cos\theta & -\sin\theta \\ 0 & \sin\theta & \cos\theta \end{pmatrix} \begin{pmatrix} Xc \\ Yc \\ Zc \end{pmatrix} + \begin{pmatrix} 0 \\ 0 \\ H \end{pmatrix} \quad (4)$$

Here, "H" in the equation (4) is a mounting height [mm] of the stereo camera 31 in the world coordinate system, and "θ" is an angle obtained by adding 90° to an angle defined by the optical axes of the first camera 32 and the second camera 33 parallel to each other and the horizontal plane.

In the present embodiment, an original point in the world coordinate system corresponds to coordinates in which the X-coordinate Xw and the Y-coordinate Yw represent a position of the stereo camera 31 and the Z-coordinate Zw represents the road surface. The position of the stereo camera 31 is an intermediate position between a lens of the first camera 32 and a lens of the second camera 33, for example.

Among the world coordinates obtained by the world coordinate conversion, the X-coordinate Xw represents a distance from the original point to a feature point in the vehicle width direction of the forklift truck 10. The Y-coordinate Yw represents a distance from the original point to the feature point in the traveling direction of the forklift truck 10. The Z-coordinate Zw represents a height from the road surface to the feature point. The feature point is a point representing a part of an obstacle. A Y-axis in the following description is in the world coordinate system. In FIG. 1, an arrow Y represents the Y-axis in the world coordinate system, an arrow Z represents a Z-axis in the world coordinate system.

Next, in Step S4, the image processing device 41 extracts an obstacle existing in the world coordinate system. The image processing device 41 defines, as one point group, a set of feature points assumed to represent the same obstacle among the feature points representing a part of the obstacle, and extracts the one point group as the obstacle. For example, the image processing device 41 performs clustering to define the feature points positioned within a predetermined range as one point group from the world coordinates of the feature points derived in Step S3. The image processing device 41 recognizes the clustered point group as one obstacle. The clustering of the feature points in Step S4 is performed by various methods. That is, the clustering may be performed by any method as long as the feature points are defined as one point group and thus recognized as the obstacle.

Next, in Step S5, the image processing device 41 derives a position of the obstacle extracted in Step S4. The image processing device 41 recognizes world coordinates of the obstacle from the world coordinates of the feature points forming the clustered point group. An X-coordinate Xw, a Y-coordinate Yw, and a Z-coordinate Zw of each feature point located at an end of the clustered point group may correspond to those of the obstacle, or an X-coordinate Xw, a Y-coordinate Yw, and a Z-coordinate Zw of a feature point as a center of the point group may correspond to those of the obstacle, for example. That is, the coordinates of the obstacle in the world coordinate system may represent the entire obstacle or one point of the obstacle.

Next, in Step S6, the image processing device 41 detects a position of the obstacle in the first image data. The position of the obstacle in the first image data may be detected from the disparity image. The position of the obstacle in the first image data are represented in an area indicating a range of the first image data. The area of the present embodiment is a rectangular area. The rectangular area is an area including the obstacle in the first image data. In the first image data obtained from the stereo camera 31, the area in which the obstacle appears is detected. The image processing device 41 associates the rectangular area with world coordinates of the obstacle derived in Step S6. For example, the image processing device 41 converts from the world coordinates into camera coordinates of the obstacle, and converts from the camera coordinates of the obstacle into coordinates of the first image data. As a result, the world coordinates of the obstacle are associated with the rectangular area. That is, the image processing device 41 can obtain world coordinates of the rectangular area. A Z-coordinate Zw of the rectangular area represents a height of the rectangular area from the road surface. That is, the image processing device 41 detects the height of the rectangular area from the road surface. The height of the rectangular area from the road surface includes a height of a lower end of the rectangular area from the road surface and a height of an upper end of the rectangular area from the road surface.

In the following description, the position of the obstacle corresponds to a position in the world coordinate system, i.e., world coordinates, and also corresponds to a position of the rectangular area. The position of the obstacle in first image data is in an image coordinate system. The image coordinate system represents pixel positions of the first image data. In the image coordinate system, an X-axis represents a horizontal direction, and a Y-axis represents a vertical direction. The position of the obstacle in the first image data also corresponds to a position of the rectangular area of the first image data. In the following description, a Y-coordinate Yi represents the Y-coordinate in the image coordinate system, as appropriate.

Person Detection Process

Figure 4:
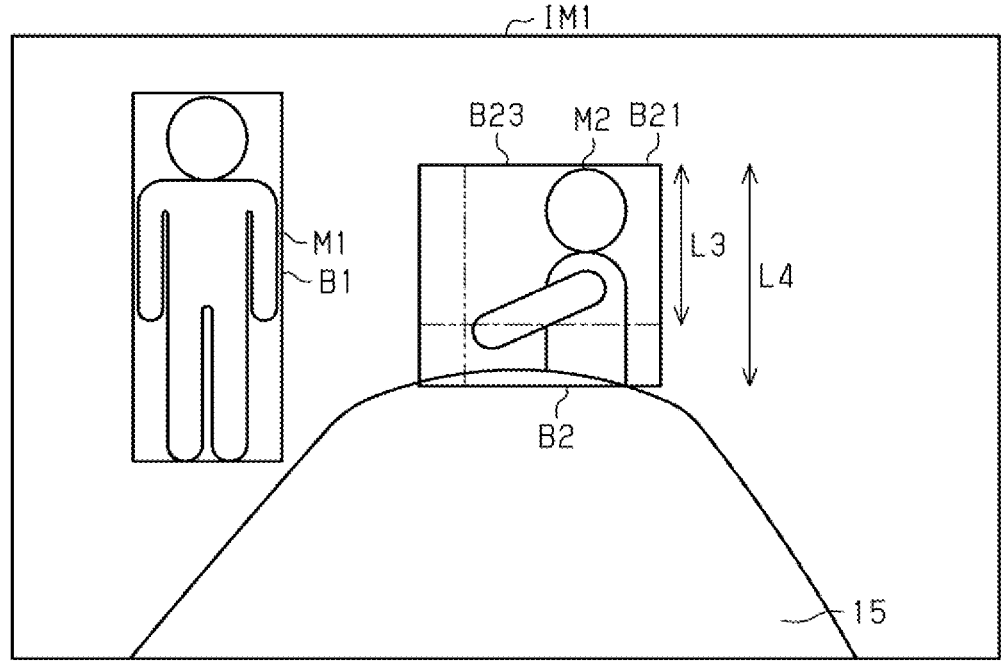
FIG. 4 is a diagram illustrating one example of first image data.

The image processing device 41 performs a person detection process for the rectangular area. In the following, as an example, rectangular areas B1, B2 are obtained by the obstacle detection process, as illustrated in FIG. 4. In FIG. 4, first image data IM1 includes a person M1 whose whole body appears and a person M2 whose lower body is hidden by the counterweight 15. In FIG. 4, the Y-coordinate Yi of a lower end of each of the rectangular areas B1, B2 of the first image data IM1 represents the lowest part of the obstacle in the first image data IM1. The Y-coordinate Yi of an upper end of each of the rectangular areas B1, B2 of the first image data IM1 represents a top of the obstacle in the first image data IM1.

Figure 5:
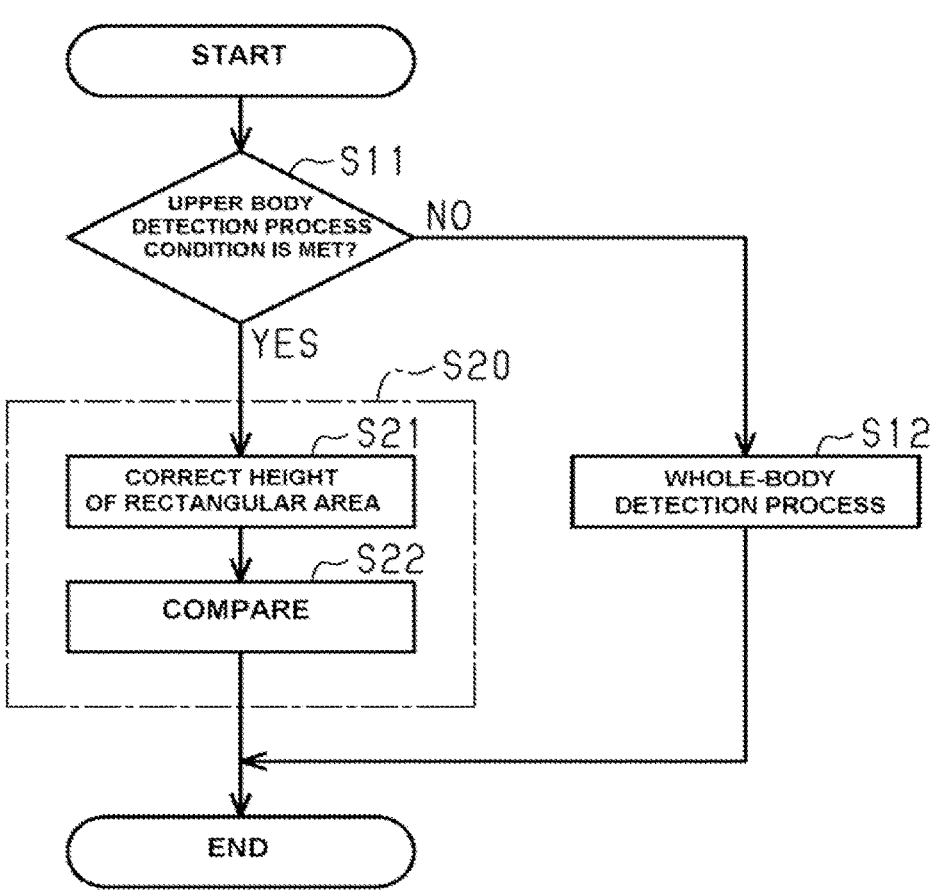
FIG. 5 is a flowchart illustrating a person detection process performed by the image processing device.

As illustrated in FIG. 5, in Step S11, the image processing device 41 determines whether the rectangular areas B1, B2 meet an upper body detection process condition. The upper body detection process condition is for determining whether the obstacle hidden by an obstruction such as the counterweight 15 appears in the first image data IM1. Specifically, the upper body detection process condition is for classifying an obstacle that may be a person whose upper body appears in the first image data IM1 and whose lower body is hidden by the obstruction, and another obstacle other than the obstacle that is such a person. When both a distance condition and a separation condition are met, the image processing device 41 determines that the rectangular areas B1, B2 meet the upper body detection process condition.

The distance condition means that a distance from a rear end of the forklift truck 10 to an obstacle is within a predetermined range. The separation condition means that an obstacle is distanced from the road surface at a predetermined height or more. As illustrated in FIG. 1, whether the distance condition is met is determined from a distance to the obstacle in a Y-axis direction. The distance to the obstacle is a distance from the rear end of the forklift truck 10 to a central position of each of the rectangular areas B1, B2 in the Y-axis direction. A distance L1 from the stereo camera 31 to the rear end of the forklift truck 10 in the Y-axis direction is known. The memory 43 pre-stores the distance L1 from the stereo camera 31 to the rear end of the forklift truck 10 or the Y-coordinate Yw of the rear end of the forklift truck 10, so that the image processing device 41 derives a distance L2 from the rear end of the forklift truck 10 to the rectangular areas B1, B2 in the Y-axis direction. Then, when the distance L2 is within a predetermined distance, the image processing device 41 determines that the distance condition is met. The predetermined distance of the distance condition is set based on resolution of the stereo camera 31 and the whole-body dictionary data D1, for example. As the resolution of the stereo camera 31 increases, features to be obtained increases, which increases the predetermined distance. As a distance from the obstacle to the stereo camera 31 increases, a size of the obstacle in the first image data IM1 is reduced. Therefore, a person detectable distance is changed depending on pixel counts of image data that is used when the whole-body dictionary data D1 is obtained. The predetermined distance may be changed depending on the person detectable distance. The Y-coordinate Yw of the obstacle represents a distance from the stereo camera 31 to the obstacle. Therefore, the distance condition determines whether the distance from the stereo camera 31 to the obstacle is within the predetermined range.

Whether the separation condition is met is determined from the Z-coordinate Zw of the lower end of each of the rectangular areas B1, B2. An original point of the Z-coordinate Zw corresponds to the road surface. Thus, the Z-coordinate Zw of the lower end of each of the rectangular areas B1, B2 represents a height H1 at which the obstacle is distanced from the road surface. As illustrated in FIG. 1, when the obstacle is hidden by the counterweight 15, a lower part of the obstacle is a blind spot in an imaging range of the stereo camera 31. When the lower part of the obstacle is hidden by the counterweight 15, in the first image data IM1, the obstacle seems to be distanced from the road surface. A predetermined height is set in accordance with a height of the stereo camera 31 and a position of the counterweight 15, for example. The predetermined height may be a height in a range hidden by the counterweight 15 when the obstacle exists within the predetermined distance. The predetermined height may be changed in accordance with the Y-coordinate Yw of each of the rectangular areas B1, B2. In this case, as the rectangular areas B1, B2 are distanced from the forklift truck 10, the predetermined height may be lowered.

The upper body detection process condition means that the obstacle is distanced from the road surface within the predetermined range from the stereo camera 31. In an example illustrated in FIG. 4, the rectangular area B1 does not meet the upper body detection process condition, and the rectangular area B2 meets the upper body detection process condition.

When a determination result in Step S11 is NO, that is, when the obstacle does not meet the upper body detection process condition, the image processing device 41 performs a process of Step S12. The following will describe Step S12 using the rectangular area B1 as an example.

Figure 6:
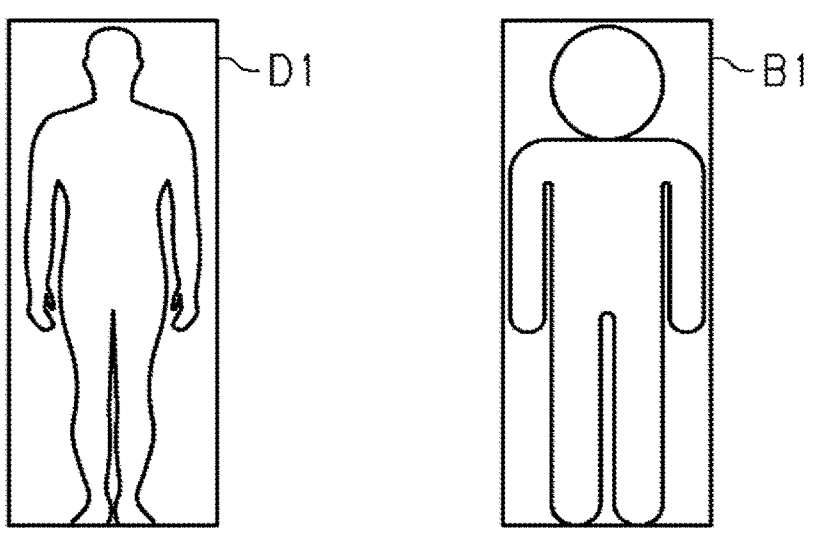
FIG. 6 is a diagram for explaining a whole-body detection process.

In Step S12, the image processing device 41 performs a whole-body detection process. As illustrated in FIG. 6, in the whole-body detection process, the rectangular area B1 corresponding to the obstacle that does not meet the upper body detection process condition is compared with the whole-body dictionary data D1. The image processing device 41 extracts features of the rectangular area B1 by the same process as features extraction used for obtaining the whole-body dictionary data D1. In the present embodiment, HOG features are extracted from the rectangular area B1. Then, person detection is performed based on machine learning and pattern matching between the HOG features extracted from the rectangular area B1 and the whole-body dictionary data D1 to determine whether the obstacle in the rectangular area B1 is a person. After the determination of Step S12, the image processing device 41 terminates the person detection process. The whole-body dictionary data D1 corresponds to whole-body comparison data.

As illustrated in FIG. 5, when the determination result in Step S11 is YES, that is, when the obstacle meets the upper body detection process condition, the image processing device 41 performs an upper body detection process S20. The upper body detection process S20 includes Step S21 and Step S22. The following will describe the upper body detection process S20 using the rectangular area B2 as an example.

In Step S21, the image processing device 41 corrects a height of the rectangular area B2 of the first image data IM1. Specifically, the image processing device 41 corrects a position of the lower end of the rectangular area B2 in the first image data IM1, and takes out a part of the rectangular area B2 from the rectangular area B2 by a predetermined length from the upper end toward the lower end of the rectangular area B2. When the obstacle in the rectangular area B2 is a person, the image processing device 41 corrects the rectangular area B2 such that the lower end of the rectangular area B2 of the first image data IM1 corresponds to a position of a chest of the person. In this case, the upper end of the rectangular area B2 of the first image data IM1 corresponds to a position of a top of head of the person. A dimension of the rectangular area B2 in the Y-axis direction in the image coordinate system, that is, a height of the rectangular area B2 of the first image data IM1 is corrected so as to correspond to a range from the chest to the top of head of the person.

The range from the chest to the top of head of the person varies depending on a height of the person. The taller the person, the greater the range from the chest to the top of head of the person. When the height of the person is 1850 [mm], generally, the chest is positioned 600 [mm] below the top of head. When the height of the person is 1700 [mm], generally, the chest is positioned 540 [mm] below the top of head. When the height of the person is 1500 [mm], generally, the chest is positioned 430 [mm] below the top of head. As described above, a general position of the chest can be recognized by the height of the person, and thus, the height of the rectangular area B2 is corrected in accordance with a position of the top of head of the person.

Figure 7:
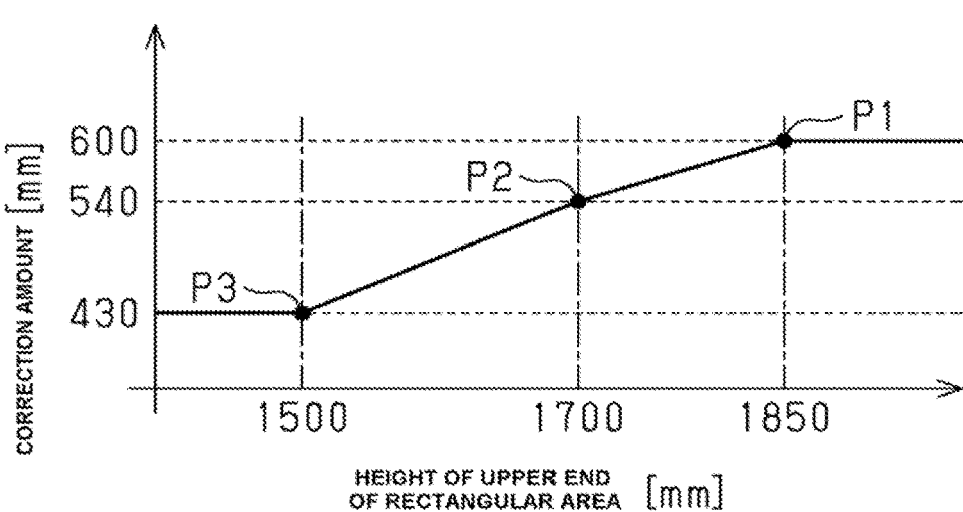
FIG. 7 is a diagram illustrating a correspondence relationship between a height of an upper end of a rectangular area and a correction amount.

As illustrated in FIG. 7, the height of the upper end of the rectangular area B2 and a correction amount are associated with each other. When a height of the upper end of the rectangular area B2 serves as a reference point, the correction amount indicates a range of the rectangular area B2 in the world coordinate system from the reference point toward the lower end of the rectangular area B2. For example, when the height of the upper end of the rectangular area B2 is 1850 [mm], the correction amount is 600 [mm]. In this case, a height of the lower end of the rectangular area B2 is 1250 [mm], which is positioned 600 [mm] below from the height of the upper end of the rectangular area B2 that is 1850 [mm]. Then, a range of the rectangular area B2 in the world coordinate system is from 1850 [mm] to 1250 [mm]. In the present embodiment, three reference points P1 to P3 are each set for the height of the upper end of the rectangular area B2 and associated with a correction amount. The three reference points P1 to P3 correspond to a first reference point P1, a second reference point P2, and a third reference point P3, respectively. The first reference point P1 is 1850 [mm]. The second reference point P2 is 1700 [mm]. The third reference point P3 is 1500 [mm]. 600 [mm] as the correction amount is associated with the first reference point P1. 540 [mm] as the correction amount is associated with the second reference point P2. 430 [mm] as the correction amount is associated with the third reference point P3.

The image processing device 41 derives the correction amount from the Z-coordinate Zw of the upper end of the rectangular area B2. When the Z-coordinate Zw of the upper end of the rectangular area B2 is a height corresponding to each of the reference points P1 to P3, the image processing device 41 derives a value associated with each of the reference points P1 to P3 as the correction amount. As described above, when the Z-coordinate Zw of the upper end of the rectangular area B2 is 1850 [mm], the image processing device 41 derives 600 [mm] as the correction amount. When the Z-coordinate Zw of the upper end of the rectangular area B2 corresponds to a height between the reference points P1 to P3, the image processing device 41 derives the correction amount from a value associated with each of the reference points P1 to P3. For example, when the Z-coordinate Zw of the upper end of the rectangular area B2 is 1600 [mm], the image processing device 41 derives the correction amount based on a value associated with the second reference point P2 and a value associated with the third reference point P3. For example, the image processing device 41 only needs to derive the correction amount corresponding to 1600 [mm] from a linear function represented by the second reference point P2, the third reference point P3, the value associated with the second reference point P2, and the value associated with the third reference point P3. When the Z-coordinate Zw of the upper end of the rectangular area B2 corresponds to a height higher than the first reference point P1, the image processing device 41 derives a value associated with the first reference point P1 as the correction amount. When the Z-coordinate Zw of the upper end of the rectangular area B2 corresponds to a height lower than the third reference point P3, the image processing device 41 derives a value associated with the third reference point P3 as the correction amount.

The image processing device 41 uses the derived correction amount to correct the height of the lower end of the rectangular area B2. The image processing device 41 sets the height of the lower end of the rectangular area B2 at a position obtained by subtracting the correction amount from the height of the upper end of the rectangular area B2. As described above, when the height of the upper end of the rectangular area B2 is 1850 [mm], the height of the lower end of the rectangular area B2 is 1250 [mm] obtained by subtracting 600 [mm] from 1850 [mm].

The image processing device 41 derives the Y-coordinate Yi of the lower end of the rectangular area B2 of the first image data IM1 from the height of the lower end of the rectangular area B2 obtained by the correction amount. The image processing device 41 uses the Z-coordinate Zw corresponding to the height of the lower end of the rectangular area B2 obtained by the correction amount to derive camera coordinates of the lower end of the rectangular area B2 obtained by the correction amount. Furthermore, the camera coordinates are converted into coordinates of the first image data IM1, which derives the Y-coordinate Yi of the lower end of the rectangular area B2 of the first image data IM1. In an example of FIG. 4, the Y-coordinate Yi of the lower end of the rectangular area B2 of the first image data IM1 is corrected to a position indicated by a dashed-dotted line. The rectangular area B2 in which the position of the lower end of the rectangular area B2 of the first image data IM1 is corrected may be referred to as a post-correction area B22. A dimension L3 of the post-correction area B22 in the Y-axis direction in the image coordinate system is smaller than a dimension L4 of the rectangular area B2 in the Y-axis direction in the image coordinate system. The post-correction area B22 of the first image data IM1 is a part of the rectangular area B2 taken out from the rectangular area B2 by a predetermined length from the upper end toward the lower end of the rectangular area B2. The predetermined length has a value obtained by converting the correction amount into a dimension in the image coordinate system. Step S21 is a process in which a part of the rectangular area B2 is taken out from the rectangular area B2 by the predetermined length from the upper end toward the lower end of the rectangular area B2 of the first image data IM1.

Figure 8:
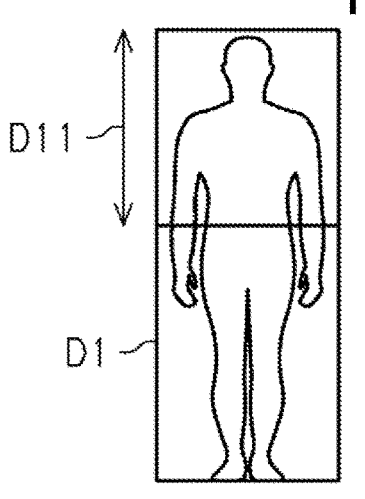
FIG. 8 is a diagram for explaining an upper body detection process.
Figure 8:
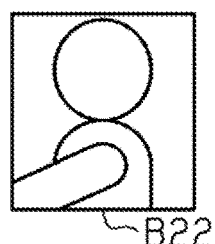

Next, in Step S22, the image processing device 41 compares the post-correction area B22 with the whole-body dictionary data D1. As illustrated in FIG. 8, comparison of the post-correction area B22 with the whole-body dictionary data D1 is performed using an area D11 representing a part of the whole-body dictionary data D1 above a position corresponding to the chest of the person. That is, the comparison is performed using the area D11 representing a part of the whole-body dictionary data D1, which is obtained from the image data in which a whole body of a person appears, corresponding to the post-correction area B22. The area D11 serves as upper body comparison data. The image processing device 41 extracts features of the post-correction area B22 by the same process as features extraction used for obtaining the whole-body dictionary data D1. In the present embodiment, HOG features are extracted from the post-correction area B22. Then, person detection is performed based on machine learning and pattern matching between the HOG features extracted from the post-correction area B22 and the area D11 to determine whether the obstacle in the rectangular area B2 is a person. Step S22 is a process in which the post-correction area B22 of the first image data IM1 taken out from the rectangular area B2 is compared with the area D11 to determine whether the obstacle in the rectangular area B2 is a person. After the determination of Step S22, the image processing device 41 terminates the upper body detection process S20 and the person detection process.

Control Performed by Controller in Accordance with Position of Person

As described above, the position of the person existing around the forklift truck 10 is detected by the person detection process. The position of the person is outputted to the controller 20. The controller 20 may control the forklift truck 10 in accordance with the position of the person. For example, when a person exists within a predetermined range from the forklift truck 10, the controller 20 may limit a vehicle speed and may allow an alarm device to issue an alarm. The alarm may be issued to a person around the forklift truck 10, or a passenger of the forklift truck 10.

Operation

The following will describe an operation of the above-described embodiment.

When the lower body of the person in the first image data IM1 is hidden by an obstruction, the upper body of the person appears in the first image data IM1. In the first image data IM1, the person whose lower body is hidden by the obstruction seems to be separated from the road surface. The image processing device 41 extracts the rectangular areas B1, B2 in which the obstacle appears, from the first image data IM1, and determines whether the obstacle is separated from the road surface in each of the rectangular areas B1, B2. When the person whose lower body is hidden by the obstruction is detected as an obstacle, the rectangular areas B1, B2 including the obstacle meet the upper body detection process condition. When the obstacle is separated from the road surface and is a person, the upper body of the person may appear in the first image data IM1. The image processing device 41 performs, for the rectangular area B2 that meets the upper body detection process condition, the upper body detection process in which the rectangular area B2 is compared with the area D11 to determine whether the obstacle in the rectangular area B2 is a person. In the above-described embodiment, although the counterweight 15 is an example of the obstruction, the obstruction may be any object other than the counterweight 15. Even in this case, the same effect is obtained by the same control as in the above-described embodiment. When the lower body of the person is not hidden by the obstruction and is positioned below the imaging range of the stereo camera 31, only the upper body of the person appears in the first image data IM1. Even in this case, the same effect is obtained by the same control as in the above-described embodiment.

Effects

The following will describe effects of the present embodiment.

(1) The image processing device 41 performs the upper body detection process in the rectangular area B2 that meets the upper body detection process condition. In the upper body detection process, the rectangular area B2 is compared with the area D11. The area D11 is an area indicating the upper body of the person, which is taken out from the whole-body dictionary data D1. When the rectangular area B2 meeting the upper body detection process condition is compared with the entire whole-body dictionary data D1, the image processing device 41 is to compare the features of the upper body obtained from the rectangular area B2 with features of the whole body obtained from the whole-body dictionary data D1. In this case, accuracy of person detection decreases since the features at different positions are compared. On the other hand, in the upper body detection process, the features of the upper body obtained from the rectangular area B2 is compared with the features of the upper body obtained from the area D11. Thus, the features at the same position are compared with each other, which suppresses the decrease in the accuracy of the person detection.

(2) The person detection system 30 is mounted on the forklift truck 10. The forklift truck 10 is often used in an environment in which a person exists around the forklift truck 10. Thus, the person near the forklift truck 10 needs to be detected by the stereo camera 31. On the other hand, the obstruction such as the counterweight 15 is easily included in the imaging range of the stereo camera 31 when the stereo camera 31 captures an image near the forklift truck 10. Thus, in the person detection system 30 mounted on the forklift truck 10, the lower body of the person is easily hidden by the forklift truck 10. Even when the lower body of the person is hidden by the forklift truck 10, the image processing device 41 of the person detection system 30 mounted on the forklift truck 10 performs the upper body detection process, which suppresses the decrease in the accuracy of the person detection.

(3) The image processing device 41 takes out an area from the rectangular area B2 by a predetermined length from the upper end toward the lower end of the rectangular area B2, and defines such an extracted area as the post-correction area B22. The post-correction area B22 is set such that a predetermined part of the person is extracted. In the present embodiment, the post-correction area B22 is set so as to represent an area above the position corresponding to the chest of the person. Thus, when the post-correction area B22 is compared with the area D11, the features at the same position are easily compared with each other, which improves the accuracy of the person detection by the image processing device 41.

(4) A person detection process using deep learning may be performed to suppress the decrease in the accuracy of the person detection. High-performance hardware is required in this case or even in a case where the whole-body dictionary data D1 and the upper body dictionary data are provided individually. On the other hand, in the present embodiment, the upper body detection process is performed using the whole-body dictionary data D1, and thus the deep learning or dedicated upper body dictionary data for the upper body detection process need not be used. This suppresses an increase in a manufacturing cost without using the high-performance hardware.

(5) In order to extract the rectangular area B2 in which a lower part of the obstacle is hidden by the obstruction, whether the rectangular area B2 includes many areas having different disparities may be calculated. For example, when the lower body of the person is hidden by the obstruction, a disparity caused by the obstruction and a disparity caused by the person are mixed in the rectangular area B2. Thus, the rectangular area B2 includes many areas having different disparities. However, in this case, even when the rectangular area B2 simply includes two obstacles, it may be determined that the rectangular area B2 includes many areas having different disparities. That is, even when the lower part of the obstacle is not hidden by the obstruction, the rectangular area B2 may be extracted as an area in which the lower part of the obstacle is hidden by the obstruction. On the other hand, in the present embodiment, in accordance with whether the obstacle is distanced from the road surface, the rectangular area B2 in which the lower part of the obstacle is hidden by the obstruction is extracted. Thus, the rectangular area B2 in which the lower part of the obstacle is hidden by the obstruction is appropriately detected.

Modified Embodiment

The above-described embodiment may be modified and implemented as follows. The embodiment and the following modified embodiment may be implemented in combination with each other to the extent that there is no technical contradiction.

Figure 9:
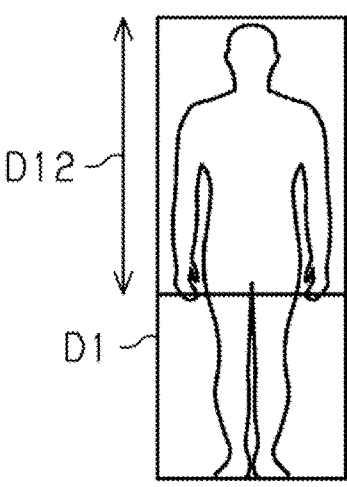
FIG. 9 is a diagram for explaining an upper body detection process according to a modified embodiment.
Figure 9:
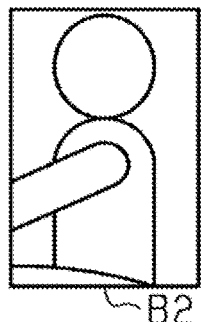

As illustrated in FIG. 9, the image processing device 41 need not correct the height of the rectangular area B2. In other words, the image processing device 41 need not derive the post-correction area B22 from the rectangular area B2. In this case, in Step S21 included in the upper body detection process S20, the image processing device 41 may perform a process in which an area ratio is detected, instead of correction of the height of the rectangular area B2. The area ratio means a ratio of a dimension of the rectangular area B2 from the lower end to the upper end of the rectangular area B2 to the height of a top of the obstacle. The height of the top of the obstacle is obtained from the Z-coordinate Zw of the upper end of the rectangular area B2. The area ratio is obtained by dividing a dimension between the Z-coordinate Zw of the upper end of the rectangular area B2 and the Z-coordinate Zw of the lower end of the rectangular area B2 by a height corresponding to the Z-coordinate Zw of the upper end of the rectangular area B2. The image processing device 41 detects the area ratio based on the height of the lower end of the rectangular area B2 from the road surface and the height of the upper end of the rectangular area B2 from the road surface. That is, Step S21 of the modified embodiment is the process in which an area ratio is detected based on the height of the lower end of the rectangular area B2 from the road surface and the height of the upper end of the rectangular area B2 from the road surface.

In Step S22 included in the upper body detection process S20, the image processing device 41 performs a process in which an area D12 obtained by applying the area ratio to the whole-body dictionary data D1 is compared with the rectangular area B2. Applying the area ratio to the whole-body dictionary data D1 means that an area in a direction from the upper end toward the lower end of the whole-body dictionary data D1 corresponding to the area ratio is taken out. Thus, when the obstacle in the rectangular area B2 is a person, the area D12 corresponding to the person is obtained. The area D12 serves as upper body comparison data. The image processing device 41 compares the area D12 with the rectangular area B2 to detect a person. That is, Step S22 of the modified embodiment is the process in which the area D12 obtained by applying the area ratio to the whole-body dictionary data D1 is compared with the rectangular area B2 of the image data to determine whether the obstacle in the rectangular area B2 is a person. Thus, the same effect as that in the above-described embodiment is obtained.

As illustrated in FIG. 2, the memory 43 may store the whole-body dictionary data D1 and the upper body dictionary data D2. The upper body dictionary data D2 corresponds to dictionary data of the features extracted from the image data in which the upper body of the person appears. In this case, in the whole-body detection process, the whole-body dictionary data D1 is used to detect a person. In the upper body detection process, the upper body dictionary data D2 is used to detect a person. The upper body dictionary data D2 corresponds to upper body comparison data.

The distance condition may be a condition in which a distance to the obstacle is within a predetermined distance from the stereo camera 31. The predetermined distance of the modified embodiment is simply required to correspond to a length in which the distance L1 is added to the predetermined distance of the above-described embodiment.

In Step S21, the image processing device 41 may correct the rectangular area B2 such that the lower end of the rectangular area B2 of the first image data IM1 corresponds to a position different from the chest of the person. For example, the image processing device 41 may correct the rectangular area B2 such that the lower end of the rectangular area B2 of the first image data IM1 corresponds to a neck or a stomach of the person. In this case, the post-correction area B22 is compared with the whole-body dictionary data D1 using the area D11 above a position of the person corresponding to the lower end of the rectangular area B2.

The stereo camera 31 may be mounted such that the counterweight 15 is not included in the imaging range.

An area in which the obstacle appears in the first image data IM1 may have any shape other than the rectangular shape, such as a circular shape.

The person detection system 30 may detect a person in front of the forklift truck 10. In this case, the stereo camera 31 is mounted so as to capture an image of an area in front of the forklift truck 10. The person detection system 30 may detect both a person in front of the forklift truck 10 and a person in the rear of the forklift truck 10. In this case, two stereo cameras 31 for capturing images of the area in front of the forklift truck 10 and an area in the rear of the forklift truck 10 may be mounted on the forklift truck 10.

The conversion from the camera coordinates into the world coordinates may be performed using table data. The table data includes table data in which the Y-coordinate Yw is associated with combination of the Y-coordinate Yc and the Z-coordinate Zc, and table data in which the Z-coordinate Zw is associated with combination of the Y-coordinate Yc and the Z-coordinate Zc. The table data is stored in the memory 43 of the image processing device 41, so that the Y-coordinate Yw and the Z-coordinate Zw in the world coordinate system are calculated from the Y-coordinate Yc and the Z-coordinate Zc in the camera coordinate system. In the above-described embodiment, since the X-coordinate Xc in the camera coordinate system coincides with the X-coordinate Xw in the world coordinate system, the table data for calculating the X-coordinate Xw is not stored.

The world coordinate system is not limited to a cartesian coordinate system, and may be a polar coordinate system.

Any cameras may be used as long as world coordinates of an obstacle can be derived from image data obtained by the camera. For example, a monocular camera or a ToF (Time of Flight) camera may be used.

The forklift truck 10 may be an engine-type forklift truck.

The stereo camera 31 may be mounted at any position such as the cargo handling apparatus 17.

The moving body may be an industrial vehicle other than the forklift truck 10 such as a towing tractor. The moving body may be any vehicle such as a passenger car, a transport vehicle, construction equipment, or a flight vehicle.

What is claimed is:

1. An image processing device of a person detection system mounted on a moving body, wherein
   the image processing device is configured to:
      detect, in image data obtained from a camera, an area in which an obstacle appears, wherein the area detected by the camera in which the obstacle appears is a rectangular area and the rectangular area is based on a detectable range of the camera;
      detect a height of a lower end of the area from a road surface and a height of an upper end of the area from the road surface;
      determine whether the area meets an upper body detection process condition, wherein the upper body detection process condition is met when a distance from the camera to the obstacle is within a predetermined range and the height of the lower end of the area is within a predetermined distance from the road surface;
      perform an upper body detection process in which the area of the image data is compared with upper body comparison data to determine whether the obstacle in the area is a person, for the area that meets the upper body detection process condition,
   wherein the upper body detection process includes:
      detect an area ratio corresponding to a ratio of a dimension of the area from the lower end to the upper end of the area to a height of a top of the obstacle based on the height of the lower end of the area from the road surface and the height of the upper end of the area from the road surface; and
      obtain the upper body comparison data by applying the area ratio to whole-body comparison data; and
      perform a whole-body detection process in which the area of the image data is compared with the whole-body comparison data to determine whether the obstacle in the area is a person, for the area that does not meet the upper body detection process condition.

2. The image processing device of the person detection system according to claim 1, wherein
   the upper body detection process includes:
      a process in which a part of the area is taken out by a predetermined length from an upper end toward a lower end of the area of the image data and the part of the area that is taken out is defined as a post-correction area; and
      a process in which the post-correction area is compared with the upper body comparison data to determine whether the obstacle in the area is a person.

3. The image processing device of the person detection system according to claim 1, wherein
   the whole-body comparison data corresponds to whole-body dictionary data of features extracted from image data in which a whole body of the person appears, and
   the upper body comparison data corresponds to upper body dictionary data of features extracted from image data in which an upper body of the person appears.

4. An image processing device of a person detection system mounted on a moving body, comprising:
   at least one memory configured to store computer program code; and
   at least one processor configured to access the at least one memory and operate as instructed by the computer program code, wherein
   the computer program code is configured to cause the at least one processor to:
      detect, in image data obtained from a camera, an area in which an obstacle appears, wherein the area detected by the camera in which the obstacle appears is a rectangular area and the rectangular area is based on a detectable range of the camera;
      detect a height of a lower end of the area from a road surface and a height of an upper end of the area from the road surface;
      determine whether the area meets an upper body detection process condition, wherein the upper body detection process condition is met when a distance from the camera to the obstacle is within a predetermined range and the height of the lower end of the area is within a predetermined distance from the road surface;
      perform an upper body detection process in which the area of the image data is compared with upper body comparison data to determine whether the obstacle in the area is a person, for the area that meets the upper body detection process condition,
   wherein the upper body detection process includes:
      detect an area ratio corresponding to a ratio of a dimension of the area from the lower end to the upper end of the area to a height of a top of the obstacle based on the height of the lower end of the area from the road surface and the height of the upper end of the area from the road surface; and
      obtain the upper body comparison data by applying the area ratio to whole-body comparison data; and
      perform a whole-body detection process in which the area of the image data is compared with the whole-body comparison data to determine whether the obstacle in the area is a person, for the area that does not meet the upper body detection process condition.

* * * * *